United States Patent Office 3,272,870
Patented Sept. 13, 1966

3,272,870
CYCLOBUTANE DERIVATIVES
John R. Caldwell and Winston J. Jackson, Jr., Kingsport, Tenn., assignors to Eastman Kodak Company, Rochester, N.Y., a corporation of New Jersey
No Drawing. Filed Apr. 23, 1962, Ser. No. 189,308
6 Claims. (Cl. 260—611)

This invention relates to the chemical arts. More particularly, it concerns a new class of organic chemical compounds and a process for making them.

The compounds of this invention are cyclobutane derivatives which are referred to generically as 1,3-bis(chloromethoxy)-2,2,4,4-tetra(lower alkyl)cyclobutanes. The molecules of these compounds conform to the structural formula:

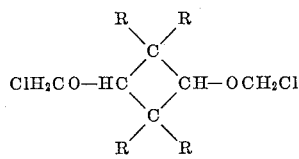

wherein each R is independently selected from the group consisting of (a) lower alkyl radicals and (b) nuclear members of saturated 5–6 carbon atom rings comprising an adajcent R as a nuclear member. A lower alkyl radical is an alkyl radical having 1–8 carbon atoms. Typical, preferred examples of such a radical are the methyl, ethyl, propyl, isopropyl, butyl, isobutyl, tert. butyl, and the like radicals.

Typical, preferred examples of compounds according to this formula are:

1,3-bis(chloromethoxy)-2,2,4,4-tetramethylcyclobutane
1,3-bis(chloromethoxy)-2,2,4,4-tetraethylcyclobutane
1,3-bis(chloromethoxy)-2,2,4,4-tetra-n-propylcyclobutane
1,3-bis(chloromethoxy)-2,2,4,4-tetra-n-butylcyclobutane
1,3-bis(chloromethoxy)-2,4-diethyl-2,4-dimethylcyclobutane
1,3-bis(chloromethoxy)-2,4-di-n-propyl-2,4-dimethylcyclobutane
1,3-bis(chloromethoxy)-2,4-di-n-butyl-2,4-dimethylcyclobutane
1,3-bis(chloromethoxy)-2,4-di-n-propyl-2,4-diethylcyclobutane
1,3-bis(chloromethoxy)-2,4-di-n-butyl-2,4-diethylcyclobutane
1,3-bis(chloromethoxy)-2,4-di-n-butyl-2,4-dipropylcyclobutane
6,12-bis(chloromethoxy)dispiro[4.1.4.1]dodecane
7,14-bis(chloromethoxy)dispiro[5.1.5.1]tetradecane The new compounds of this invention have utility as intermediates in the preparation of other compounds characterized by high hydrolytic stability and useful as synthetic lubricants and plasticizers. Thus, by treating the compounds of this invention with a sodium alkoxide or by adding pryridine to solutions of the compounds of this invention and alcohols (for example, ethanol, n-octanol, 2-ethylhexanol and the like) or by reacting the compounds of this invention according to the procedures described in Bull. Soc. Chim., 14, 468–476 (1947), there can be prepared the corresponding 1,3-bis(alkoxymethoxy)-2,2,4,4-tetra(lower alkyl)cyclobutanes which are useful as synthetic lubricants and plasticizers, characterized by high hydrolytic stability. Also, by adding pyridine to solutions of the compounds of this invention and diols, polyformals with high hydrolytic stability are obtained.

The compounds of this invention are made by a process of this invention, which comprises fully chloromethylating the corresponding 2,2,4,4-tetra(lower alkyl)-1,3-cyclobutanediols. The corresponding 2,2,4,4-tetra(lower alkyl)-1,3-cyclobutanediols are known compounds which are represented by the formula:

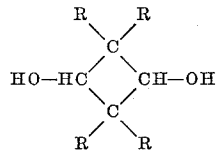

wherein each R is independently selected from the group consisting of (a) lower alkyl radicals and (b) nuclear members of saturated 5–6 carbon atom rings comprising an adjacent R as a nuclear member. Those cyclobutanediols wherein each R is a lower alkyl radical are obtained as disclosed in the U.S. Patent, No. 2,936,324, to Hasek and Elam. These cyclobutanediols wherein each R is a nuclear member of a saturated 5–6 carbon atom ring comprising an adjacent R are obtained as by the procedures indicated in Examples 4 and 5 hereinafter presented. Full or complete chloromethylation of these diols is performed by treating them with formaldehyde and hydrogen chloride at a mole ratio of formaldehyde to hydrogen chloride to diol of at least about 2:2:1.

A preferred embodiment of the process of this invention comprises adding hydrogen chloride gas to a cold mixture consisting essentially of at least one of the defined 2,2,4,4 - tetra(lower alkyl) - 1,3-cyclobutanediols, formaldehyde (at a mole ratio to said diol of at least about 2:1) and an inert, water immiscible organic solvent for the desired product. The hydrogen chloride gas is preferably added until the mixture is saturated with it. When this condition is reached the mole ratio of hydrogen chloride added to the diol initially present is in substantial excess of 2:1. Temperature of the mixture is generally in a range from about −10 to about 60° C. and preferably in a range from about 0 to 10° C. Preferably the mixture is initially made up with paraformaldehyde which depolymerizes in the presence of the hydrogen chloride to formaldehyde. Instead of paraformaldehyde, which is preferred, gaseous formaldehyde, trioxane and, less desirably, aqueous formaldehyde can be used. If desired, the mixture can also be made up with an acid such as, for example, concentrated hydrochloric acid, toluenesulfonic acid, dilute sulfuric acid and the like to assure the acidic condition of the mixture. The inert, water immiscible, organic solvent is preferably ethylene dichloride. However, other inert, water immiscible, organic solvents such as, for example, benzene, toluene, methylene chloride and the like, can be employed.

In this preferred embodiment, as the reaction takes place, the components go into solution and an aqueous layer separates. In the more specific aspects of this preferred embodiment, upon completion of the reaction, the desired product, the 1,3-bis(chloromethoxy)-2,2,4,4-tetra(lower alkyl)cyclobutane, is separated from the reaction mixture. This is done preferably by separating the organic solvent layer or solution from the aqueous layer, adding a base such as sodium bicarbonate to the organic solvent solution to neutralize the acid content, drying the neutralized organic solvent solution and then distilling.

This invention is further illustrated by the following examples of specific embodiments thereof. This invention is not limited to these specific embodiments unless otherwise indicated.

*Example 1*

This example illustrates the preparation of 1,3-bis(chloromethoxy)-2,2,4,4-tetramethylcyclobutane.

A mixture of 432 grams (3 moles) of 2,2,4,4-tetramethyl-1,3-cyclobutanediol, 198 grams of paraformaldehyde (equivalent to 6.6 moles of formaldehyde) and 2400 milliliters of ethylene dichloride is stirred at a temperature of 0–10° C. in an ice bath while gaseous hydrogen chloride is passed into the mixture until it is saturated. Typically, about 388 grams (10.6 moles) of gaseous hydrogen chloride is thereby taken up into the mixture. As the hydrogen chloride gas is passed into the mixture, the diol and paraformaldehyde go into solution and an aqueous layer forms. The resulting mixture is allowed to stand overnight. Then, the aqueous layer is removed and the solvent layer or solution is stirred with sodium bicarbonate to neutralize the acid. The neutralized organic solvent solution is dried over sodium sulfate, concentrated and then distilled. The product thereby obtained is typically a low melting, white solid boiling at 95–98° C. at 3 millimeters of mercury pressure. A typical yield of this product is 550 grams (2.3 moles) or 76%. The calculated C, H and Cl content of the desired compound, 1,3-bis-(chloromethoxy) - 2,2,4,4 - tetramethylcyclobutane, is: C=49.9%, H=7.5% and Cl=29.4%. A typical analysis of the product is: C=50.12%, H=7.62% and Cl=29.28%.

*Example 2*

This example illustrates the preparation of 1,3-bis-(chloromethoxy)-2,4-diethyl-2,4-dimethylcyclobutane.

A mixture of 517 grams (3 moles) of 2,4-diethyl-2,4-dimethyl-1,3-cyclobutanediol, 198 grams of paraformaldehyde (equivalent to 6.6 moles of formaldehyde) and 2400 milliliters of ethylene dichloride is stirred at 0–10° C. in an ice bath while passing gaseous hydrogen chloride into the mixture until the mixture is saturated with hydrogen chloride. The resulting mixture is allowed to stand overnight. During this time an aqueous layer forms. The water layer is removed from the ethylene dichloride solution, the solution is stirred with sodium bicarbonate powder, dried over sodium sulfate, concentrated and distilled. The desired product, essentially 1,3-bis(chloromethoxy)-2,4-diethyl-2,4-dimethylcyclobutane, typically distills at 124–127° C. at 5 millimeters mercury pressure.

*Example 3*

This example illustrates the preparation of 1,3-bis-(chloromethoxy)-2,4-di-n-butyl-2,4-diethylcyclobutane.

A mixture of 769 grams (3 moles) of 2,4-di-n-butyl-2,4-diethyl-1,3-cyclobutanediol, 198 grams of paraformaldehyde (equivalent to 6.6 moles of formaldehyde) and 2400 millimeters of ethylene dichloride is stirred at 0–10° C. in an ice bath while introducing hydrogen chloride gas into the mixture until it is saturated with hydrogen chloride. The mixture is then allowed to stand overnight. During this time an aqueous layer forms. The aqueous layer is separated from the ethylene dichloride solution and the solution is then stirred with sodium bicarbonate powder, dried over sodium sulfate, concentrated and distilled. The desired product, 1,3-bis(chloromethoxy)-2,4-di-n-butyl-2,4-diethylcylobutane, typically distills over at 146–150° C. at 2 millimeters of mercury pressure.

*Example 4*

This example illustrates the preparation of 6,12-bis-(chloromethoxy)dispiro[4.1.4.1]dodecane.

A mixture of 589 grams (3 moles) of dispiro[4.1.4.1]-dodecane-6,12-diol, prepared as described in J. Org. Chem., 18, 702 (1953), 198 grams of paraformaldehyde (equivalent to 6.6 moles of formaldehyde) and 2400 milliliters of ethylene dichloride is stirred at a temperature of 0–10° C. in an ice bath while gaseous hydrogen chloride is passed into the mixture until it is saturated. As the hydrogen chloride gas is taken up by the mixture, the diol and paraformaldehyde go into solution and an aqueous layer forms. The resulting mixture is allowed to stand overnight. Then, the aqueous layer is removed from the ethylene dichloride solution, the solution is stirred with sodium bicarbonate powder, dried over sodium sulfate, concentrated and distilled. The desired product, essentially 6,12-bis(chloromethoxy)dispirol[4.1.4.1]dodecane, typically distills at 115–118° C. at 1 millimeter mercury pressure.

*Example 5*

This example illustrates the preparation of 7,14-bis-(chloromethoxy)dispiro[5.1.5.1]tetradecane.

A mixture of 673 grams (3 moles) of dispiro[5.1.5.1]-tetradecane-7,14-diol, made by first preparing, as described in J. Am. Chem. Soc., 75, 6339 (1953), the compound dispirol[5.1.5.1]-tetradecane-7,14-dione and then reducing this compound with lithium aluminum hydride to the diol by the procedure described in J. Org. Chem., 18, 702 (1953), 198 grams of paraformaldehyde (equivalent to 6.6 moles of formaldehyde) and 2400 milliliters of ethylene dichloride is stirred at a temperature of 0–10° C. in an ice bath while gaseous hydrogen chloride is passed into the mixture until it is saturated. As the hydrogen chloride gas is taken up by the mixture, the diol and paraformaldehyde go into solution and an aqueous layer forms. The resulting mixture is allowed to stand overnight. Then, the aqueous layer is removed from the ethylene dichloride solution, the solution is stirred with sodium bicarbonate powder, dried over sodium sulfate, concentrated and distilled. The desired product, essentially 7,14 - bis(chloromethoxy)dispiro[5.1.5.1]tetradecane, distills typically at 130–135° C. at a millimeter mercury pressure.

Thus, there are provided a new class of compounds and a process by which they can readily be made.

Other features, advantages and embodiments of this invention will be apparent to those in the exercise of ordinary skill in the art after reading the foregoing disclosure. In this regard, while this invention has been described in detail relative to certain specific embodiments thereof, variations and modifications of these embodiments can be effected within the spirit and scope of the invention as disclosed and claimed.

The embodiments of the invention in which an exclusive property or privilege is claimed are defined as follows:

1. A cyclobutane derivative of the formula:

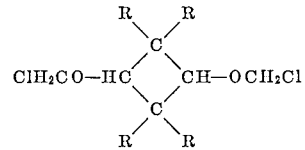

wherein each R is independently selected from the group consisting of (a) lower alkyl radicals and (b) nuclear members of saturated 5–6 carbon atom rings comprising an adjacent R as a nuclear member.

2. 1,3 - bis(chloromethoxy)-2,2,4,4 - tetramethylcyclobutane.

3. 1,3-bis(chloromethoxy) - 2,4 - diethyl-2,4-dimethylcyclobutane.

4. 1,3 - bis(chloromethoxy) - 2,4 - di-n-butyl-2,4-diethylcyclobutane.

5. 6,12-bis(chloromethoxy)dispiro[4.1.4.1]dodecane.

6. 7,14-bis(chloromethoxy)dispirol[5.1.5.1]tetradecane.

References Cited by the Examiner

UNITED STATES PATENTS 3,004,889 10/1961 Kuna et al. _____ 260—617 X

OTHER REFERENCES

Lichtenberger et al.: Bull. Soc. Chim., vol. 14 (1947), pages 468–476.

Wagner et al.: Synthetic Organic Chemistry (1953), page 230.

Walborsky: Jour. Org. Chem., vol. 18 (1953), pages 702–706.

Walborsky et al.: Jour. Amer. Chem. Soc., vol. 75 (1953), pages 6339–6340.

LEON ZITVER, *Primary Examiner.*

B. HELFIN, *Assistant Examiner.*